United States Patent [19]

Pryor

[11] 4,179,819
[45] Dec. 25, 1979

[54] METHOD FOR CONTROLLING EMISSIONS OF ETHYLENE TO THE ATMOSPHERE

[75] Inventor: Bodie C. Pryor, Port Arthur, Tex.

[73] Assignee: Gulf Oil Corporation, Pittsburgh, Pa.

[21] Appl. No.: 901,384

[22] Filed: May 1, 1978

[51] Int. Cl.² ............................................. F26B 7/00
[52] U.S. Cl. ............................................ 34/12; 34/72; 432/72
[58] Field of Search .................. 34/12, 13, 72, 79; 432/72; 431/202, 287

[56] References Cited
U.S. PATENT DOCUMENTS 2,779,399  1/1957  Zink et al. ............................... 431/92
3,909,953  10/1975 Hemsath et al. ......................... 34/72
4,118,170  10/1978 Hirt ......................................... 431/202
4,132,006  1/1979  Scholz et al. ............................ 34/10

*Primary Examiner*—John J. Camby
*Attorney, Agent, or Firm*—Richard L. Kelly

[57] ABSTRACT

In the extruding, cooling, pelletizing, drying, and storing of ethylene polymers prepared by a high pressure continuous mass process, air coming in contact with the polymer and the cooling water is diluted with low concentrations of ethylene gas. This dilute air-ethylene mixture is drawn into an air stream fed to a flare stack gas burner as a component of the oxidizing gas to avoid release of the ethylene to the atmosphere.

1 Claim, 1 Drawing Figure

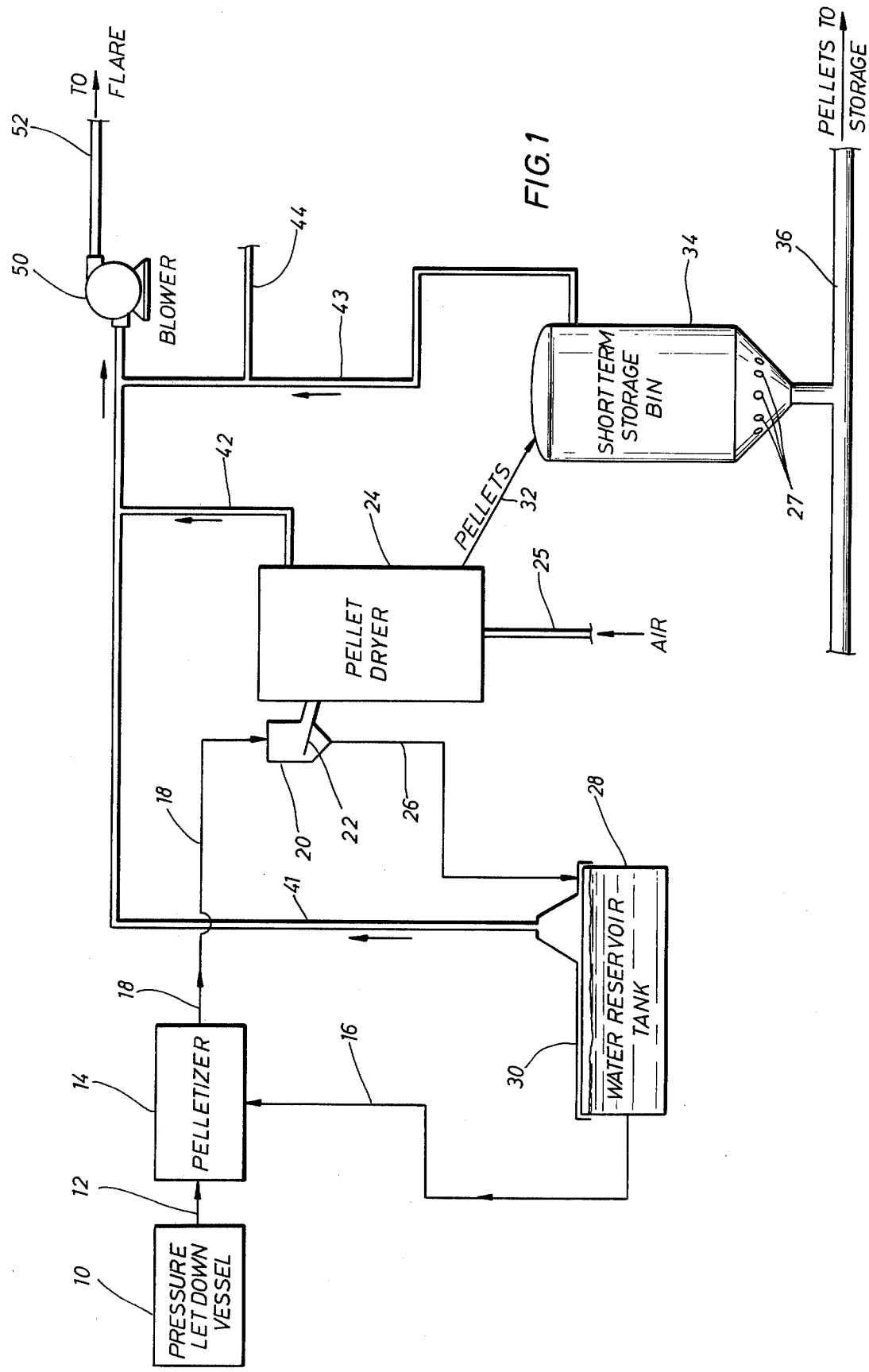

METHOD FOR CONTROLLING EMISSIONS OF ETHYLENE TO THE ATMOSPHERE

BACKGROUND OF THE INVENTION

In the manufacture of low density ethylene polymers by a continuous mass polymerization process the ethylene is polymerized to a conversion of less than 20% at a temperature in excess of 200° C. and at a pressure in excess of 1,000 atmospheres. The product from the reactor is let down to pressures just slightly in excess of atmospheric pressure in one or more pressure let-down vessels to remove substantially all unpolymerized ethylene from the ethylene polymer. The molten ethylene polymer then is extruded, cooled with water, and cut into pellets. The pellets then are dried and transferred to suitable bins for storage.

The pelletized ethylene polymer contains small quantities of ethylene gas which may amount to about 0.1 weight % of the polymer. This gas diffuses into the water used to cool the pellets and into the atmosphere in the dryer and storage bins. The concentration of the ethylene gas in the air is so low that it is not economically feasible to collect and recycle it, or to burn it in catalytic converters. While the concentration of ethylene gas is too low for economic recovery or burning by existing techniques, the total quantity of ethylene gas presently lost to the atmosphere in a large polymer production plant can easily exceed 1.000 lbs./day. The loss of this ethylene to the atmosphere is objectionable from a view of air quality.

In view of the above facts, there is a need in the art for an efficient and low cost process for recovering and/or burning the dilute ethylene gas presently lost to the atmosphere in ethylene polymer production facilities.

SUMMARY OF THE INVENTION

The present invention provides low-cost modified equipment and operating procedures by which trace quantities of ethylene diffusing into air in the extrusion, cooling, pelletizing and storage of ethylene polymers prepared by a high pressure continuous mass process are collected and disposed of by combustion. Specifically, a vent hood provided with an air outlet is placed over the water reservoir tank, and air inlets and outlets are provided in the pellet dryer and the storage bins. Each of these air outlets is attached to the inlet of an air blower which feeds air to a flare stack gas burner. Operation of the blower creates a sufficient pressure differential so that the dilute air-ethylene mixture from the water reservoir, the pellet dryer and the storage bin are fed to the flare stack gas burner as a component of the oxidizing gas.

BRIEF DESCRIPTION OF THE DRAWING

The single FIGURE is a flow diagram showing operation of the invention.

DETAILED DESCRIPTION OF THE INVENTION

Vessel 10 is a low pressure let-down chamber of a mass ethylene polymerization reactor and typically discharges molten ethylene polymer at a temperature in excess of about 200° C. The molten polymer typically will contain about 0.1 weight % of unpolymerized ethylene dissolved therein. The molten polymer is fed via line 12 to an extruder 14. A spray of water from line 16 is directed against the extrudate as it leaves the die to rapidly cool it so that it can be cut into pellets by a cutting head (not shown). The pellets and water are fed via line 18 to a head box 20. Head box 20 includes a perforated shoot 22 which feeds the resin pellets to a dryer 24. The water is fed via line 26 to a water reservoir tank 28 which includes cooling means (not shown) to remove heat from the water. A vent hood 30 covers tank 28.

The polymer pellets in pellet dryer 24 are fed by gravity via line 32 to a short term storage bin 34. The capacity of dryer 24 and the discharge rate through line 32 are designed so that the average residence time of the pellets in the dryer is sufficient to evaporate essentially all occluded water on the pellets before they leave the dryer. An air inlet line 25 is provided to admit air into the dryer 24 to aid in drying the polymer pellets. The short term storage bin 34 typically will have a capacity sufficient to hold 1-4 hours of polymer production. A series of air vents 27 are provided near the bottom of bin 34. Periodically the dried pellets in bin 34 will be conveyed via line 36 to longer term storage silos (not shown).

Air lines 41, 42 and 43 are provided to run from vent hood 30, pellet dryer 24, and short term storage bin 34 to the air inlet side of an air blower 50. An additonal air line 44 is teed into line 43 and communicates with one or more storage silos which hold ethylene polymer produced in the plant. Air blower 50 is operated to generate a pressure differential of the order of 3-5 psi on its inlet side. Thus air is drawn into blower 50 from the vent hood 30, the pellet dryer 24, the short term storage bin 34 and the product storage silos. As each of these elements is in open communication with the atmosphere, the air drawn into the blower sweeps over the cooling water in reservoir tank 28 and the resin pellets in the pellet dryer and the storage bins and silos. This action carries any released ethylene gas into the blower 50.

The blower 50 delivers the air-ethylene mixture via line 52 to a flare stack gas burner of the type shown in U.S. Pat. No. 2,779,399. This stream is employed to supply the oxidizing gas to the pilot flames of the flare gas stack burner. In addition, a portion of the air is mixed with the steam employed as a smoke retardant in operation of the flare gas stack burner and serves to reduce the steam requirements of the burner.

In the operation of a facility producing ethylene polymer at a rate of 10,000 lbs./hr., air blower 50 will be operated to deliver about 10,000 ft.$^3$/min. of gas to the flare gas stack burner. The gas will contain about 500-1,000 ppm of ethylene.

What is claimed is:

1. In a process in which:
    (a) an ethylene polymer is prepared by a mass polymerization process carried out at an elevated temperature under superatmospheric pressure,
    (b) the molten ethylene polymer and unpolymerized ethylene are discharged from the polymerization reactor and passed through at least one pressure let down zone to remove the bulk of the unpolymerized ethylene from the molten ethylene polymer,
    (c) the molten ethylene polymer from step (b) is extruded, contacted with water to solidify the polymer, and chopped into pellets,
    (d) the water and ethylene polymer pellets from step (c) are separated with the polymer pellets being fed to a pellet dryer and the water being fed to a water reservoir tank, (e) the dried pellets from the dryer of (d) are transferred to storage bins, and (f) water from the reservoir tank of (d) is recycled to cool additional ethylene polymer;

the improvement which consists essentially of:

(g) covering the water reservoir tank with a vent hood having an air outlet affixed thereto, (h) providing an air inlet and an air outlet in the pellet dryer, (j) providing an air inlet and an air outlet in the product storage bin, (k) connecting the air outlets of the vent hood, the pellet dryer, and the product storage bin to the inlet of an air blower, (l) operating the air blower to draw ethylene gas and air from the vent hood, the pellet dryer and the product storage bin, and (m) feeding the air-ethylene output of the air blower to a flare stack gas burner.

* * * * *